(12) United States Patent
Kim

(10) Patent No.: US 7,817,993 B2
(45) Date of Patent: Oct. 19, 2010

(54) SYSTEM AND METHOD FOR COPYING RING BACK TONE TRANSFER SOUND

(75) Inventor: Jun Su Kim, Seoul (KR)

(73) Assignee: RealNetworks Asia Pacific Co., Ltd., Seoul (KR)

( * ) Notice: Subject to any disclaimer, the term of this patent is extended or adjusted under 35 U.S.C. 154(b) by 813 days.

(21) Appl. No.: 11/718,523

(22) PCT Filed: Nov. 22, 2005

(86) PCT No.: PCT/KR2005/003942

§ 371 (c)(1),
(2), (4) Date: May 3, 2007

(87) PCT Pub. No.: WO2006/057504

PCT Pub. Date: Jun. 1, 2006

(65) Prior Publication Data

US 2008/0096535 A1     Apr. 24, 2008

(30) Foreign Application Priority Data

Nov. 25, 2004   (KR) ...................... 10-2004-0097543

(51) Int. Cl.
*H04M 3/00*        (2006.01)

(52) U.S. Cl. .................. 455/418; 455/414.1; 455/550.1; 455/567; 379/179; 379/207.08; 379/207.16; 379/252; 379/350

(58) Field of Classification Search .............. 455/414.1, 455/418, 550.1, 567; 379/179, 207.08, 207.16, 379/252, 350
See application file for complete search history.

(56) References Cited

U.S. PATENT DOCUMENTS

2004/0184595 A1   9/2004   Urata et al.

FOREIGN PATENT DOCUMENTS

| FR | 2834576 A1 | * | 7/2003 |
| KR | 1020030067613 A | | 8/2003 |
| KR | 1020050001232 A | | 1/2005 |
| KR | 1020050099730 A | | 10/2005 |

OTHER PUBLICATIONS

English Translation of Abstract from FR-2834576 (Jul. 2003, Bohbot, 1 page).*
English translation of IDS prior art provided from applicant (Ahn, pub document '613, Aug. 2003).*

* cited by examiner

*Primary Examiner*—Stephen M D'Agosta
(74) *Attorney, Agent, or Firm*—Hammer & Associates, P.C.

(57) ABSTRACT

Disclosed is a method for setting up a substituted ring back tone (RBT) provided from a predetermined communication provider, and more particularly, a method and system for recognizing a first substituted RBT of a first subscriber and setting up the first substituted RBT as a substituted RBT of a second subscriber, between subscribers of different communication providers. According to the present invention, it is possible to easily copy a substituted RBT from another user's substituted RBT and set up the same as a user's own substituted RBT. In this instance, the substituted RBT is provided according to a request for a call setup of a mobile terminal. Also, it is possible to set up a substituted RBT of a subscriber of a different communication provider as a user's substituted RBT, while not receiving predetermined information from the communication provider.

11 Claims, 7 Drawing Sheets

< CONTENT DATABASE(201) >

| IDENTIFICATION INFORMATION | SECOND CHARACTERISTIC DATA |
|---|---|
| 1111 |  |
| 2222 |  |
| 3333 |  |
| 4444 |  |

FIG. 4

< SUBSTITUTED RBT SERVER(401)>

| IDENTIFICATION INFORMATION | SECOND SUBSTITUTED RBT |
|---|---|
| 1111 | LOVE2.WAV |
| 2222 | POEM.WAV |
| 3333 | SADFATE.WAV |
| 4444 | SADPROMISE.WAV |

SYSTEM AND METHOD FOR COPYING RING BACK TONE TRANSFER SOUND

TECHNICAL FIELD

The present invention relates to a method for setting up a substituted ring back tone (RBT) provided from a predetermined communication provider, and more particularly, to a method and system for recognizing a first substituted RBT of a first subscriber and setting up the first substituted RBT as a substituted RBT of a second subscriber, between subscribers of different communication providers.

BACKGROUND ART

Thanks to the development of networks, many people are currently using mobile terminals. Also, while the utilization of mobile terminals increase, various types of multimedia data providing services, having the original purpose of making a call, and individual characteristics are provided. A substituted ring back tone (RBT) service is a representative example.

Generally, in the case of requesting a call setup, a predetermined RBT is transmitted from a communication provider of a mobile terminal receiving the request for call setup. A subscriber listens to the RBT via a mobile terminal having requested the call setup. However, the RBT repeats a monotonous tone. Accordingly, an RBT may not satisfy a subscriber of a mobile terminal requesting a call setup. Also, an RBT is not different for each subscriber of a communication provider. Namely, the same RBT is provided to every subscriber. Accordingly, even in the case of dialing a wrong number, unless a caller actually communicates with a called party, the caller may not easily recognize that the caller dialed the wrong number. Because of the aforementioned reasons, a substituted RBT that a subscriber of a mobile terminal can select and set up has emerged. A substituted RBT as described above is gaining interests from a lot of mobile terminal subscribers. Currently, many mobile communication subscribers and legacy network subscribers set up a substituted RBT in their own mobile terminals.

A subscriber of a mobile terminal may select the substituted RBT in a predetermined server and set up the same as his/her own substituted RBT. Also, the subscriber may set up the substituted RBT by accessing a server of a predetermined communication provider via his/her mobile terminal or by accessing a predetermined server via a computer device. Also, subscribers of mobile terminals of the same communication provider may share information on their substituted RBTs. Accordingly, a subscriber may replace the other subscriber's substituted RBT that the subscriber is currently listening to, with his/her own substituted RBT. As a representative example of this case, a "catch music" service provided from KTF.

The "catch music" service is a service of detecting a user's input of a Dual Tone Multi Frequency (DTMF) tone with respect to a particular substituted RBT and setting up the substituted RBT as the user's substituted RBT, when a call connection between subscribers of the same communication provider is being processed. The "catch music" service is being provided between subscribers of the same communication provider managing users' RBT sound sources or sound source identification signals. To provide the "catch music" service between subscribers of different communication providers, information on a substituted RBT sound source set up by a corresponding subscriber is needed. However, because of personal information protection, it is not easy to open corresponding sound source information to another communication provider.

Accordingly, to copy a particular substituted RBT between subscribers of different communication providers, a subscriber who wants to replace the substituted RBT with the subscriber's substituted RBT has to directly access a predetermined server and select a substituted RBT. Also, when there is no information on a corresponding sound source, such as a title of song, the subscriber may not be able to set up the substituted RBT in his/her mobile terminal. Also, in the case of copying a substituted RBT between subscribers of different communication providers, the aforementioned personal information protection may be issued. Accordingly, the "catch music" service may not be applicable.

DISCLOSURE OF INVENTION

Technical Goals

The present invention is conceived to outperform the aforementioned conventional art, and the present invention provides a substituted RBT copying method and system which can easily copy a substituted RBT from another user's substituted RBT and set up the same as a user's own substituted RBT. In this instance, the substituted RBT is provided according to a request for a call setup of a mobile terminal.

The present invention also provides a substituted RBT copying method and system which can copy a substituted RBT between subscribers of different communication providers, while not exchanging a subscriber's personal information.

The present invention also provides a substituted RBT copying method and system in which a user who wants to copy a substituted RBT during a request for a call setup can copy a corresponding substituted RBT as his/her substituted RBT by transmitting a predetermined DTMF tone when a substituted RBT is being transmitted from a communication provider subscribed by a called party, or by accessing the web or utilizing the Wireless Application Protocol (WAP) after hanging up the phone.

Technical Solutions

To achieve the above objectives and solve the aforementioned problems in the conventional art, according to an aspect of the present invention, there is provided a system for copying a substituted RBT between subscribers of different communication providers, the system including: a content database maintaining identification information of a second substituted RBT; a request receiving unit receiving a request for copying a substituted RBT of a subscriber of a first communication provider, from a subscriber of a second communication provider; a call setup request unit requesting a first mobile terminal of the subscriber of the first communication provider to set up a call in correspondence to the request for copying of the substituted RBT; a substituted RBT analysis unit analyzing a first substituted RBT provided from the first communication provider and recognizing a sound source of the first substituted RBT to analyze first characteristic data of the first substituted RBT, in the case of requesting the first mobile terminal to set up a call; a substituted RBT extraction unit extracting the identification information of the second substituted RBT corresponding to the first characteristic data by referring to the content database; and a substituted RBT setup unit setting up a second substituted RBT corresponding to the identification information extracted from the substituted RBT extraction unit, as a substituted RBT for a second mobile terminal of the subscriber of the second communication provider.

Also, according to another aspect of the present invention, there is provided a method for copying a substituted RBT between subscribers of different communication providers, the method including the steps of: maintaining identification information of a second substituted RBT; receiving a request for copying a substituted RBT of a subscriber of a first communication provider, from a subscriber of a second communication provider; requesting a first mobile terminal of the subscriber of the first communication provider to set up a call in correspondence to the request for copying of the substituted RBT; analyzing a first substituted RBT provided from the first communication provider and recognizing a sound source of the first substituted RBT to analyze first characteristic data of the first substituted RBT, in the case of requesting the first mobile terminal to set up a call; extracting the identification information of the second substituted RBT corresponding to the first characteristic data by referring to the content database; and setting up the second substituted RBT corresponding to the identification information extracted from the substituted RBT extraction unit, as a substituted RBT for a second mobile terminal of the subscriber of the second communication provider.

BRIEF DESCRIPTION OF DRAWINGS

The above and/or other aspects and advantages of the present invention will become apparent and more readily appreciated from the following detailed description, taken in conjunction with the accompanying drawings of which:

FIG. 4 is a diagram illustrating an internal configuration of a database maintaining a second substituted RBT according to the present invention;

BEST MODE FOR CARRYING OUT THE INVENTION

Figure 1:
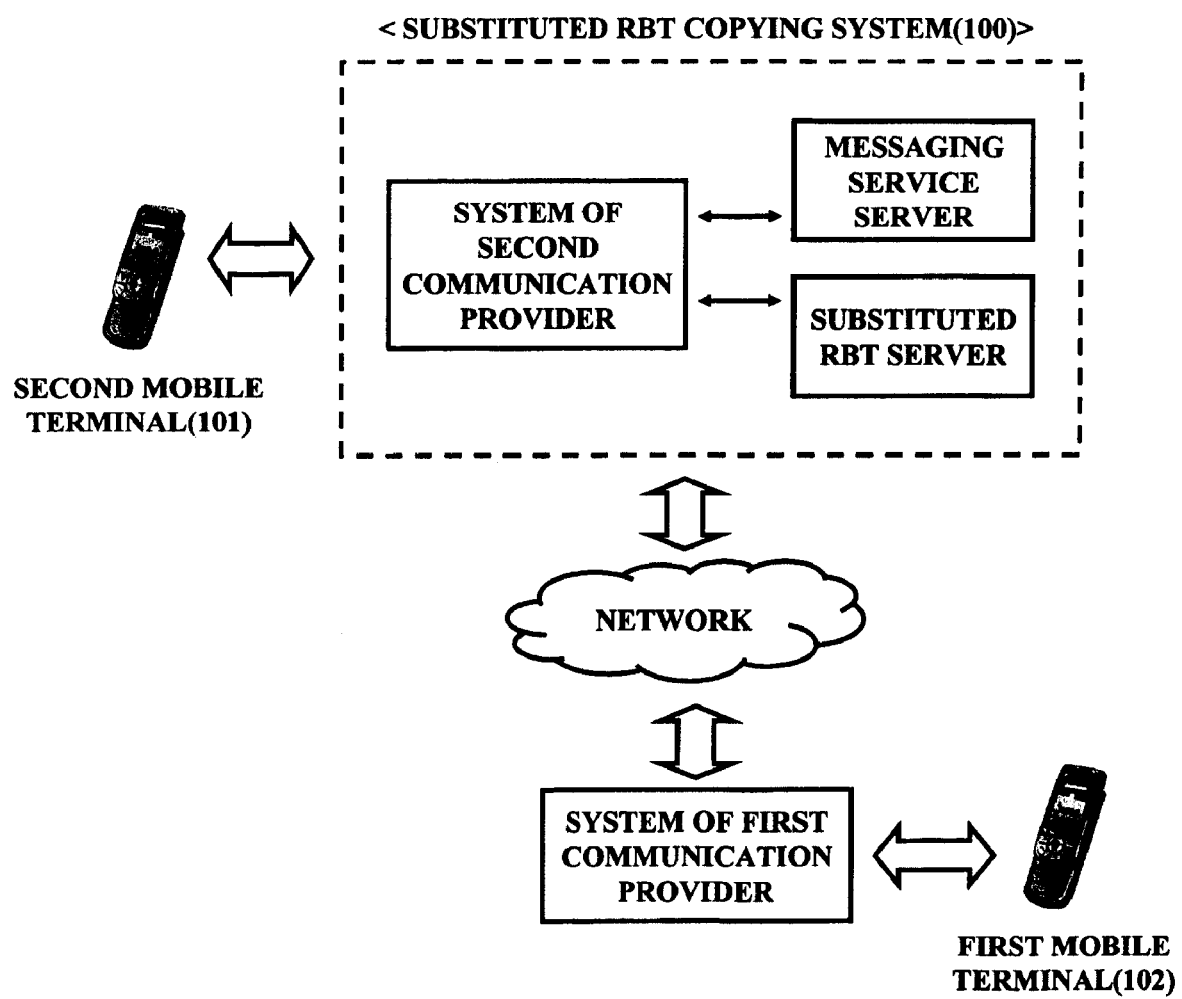
FIG. 1 is a diagram illustrating a configuration of a network for exchanging a substituted RBT between different communication providers by using a substituted RBT copying system according to the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a configuration of a network for exchanging a substituted RBT between different communication providers by using a color ring back tone (RBT) copying system according to the present invention As illustrated in FIG. 1, in a substituted RBT copying system 100 according to the present invention, a second mobile terminal 101 of a second communication provider transmits a request for copying of a predetermined substituted RBT to the substituted RBT copying system 100. In this instance, the substituted RBT is provided according to a request for a call setup with a first mobile terminal 102 of a first communication provider. The first communication provider and the second communication provider are different network providers, and also do not share subscribers' personal information.

The substituted RBT copying system 100 receives the request for copying of the substituted RBT and requests a system of the first communication provider to set up a call with the first mobile terminal 102. Also, the substituted RBT copying system 100 records a first substituted RBT provided from the system of the first communication provider or a predetermined substituted RBT server according to the request for the call setup. In this case, the substituted RBT copying system 100 may record the whole of the first substituted RBT or may record a minimal section with which is sufficient to identify sound source information on the first substituted RBT. The substituted RBT copying system 100 recognizes the sound source and analyzes the recorded first substituted RBT. A second substituted RBT corresponding to the first substituted RBT is extracted from a predetermined substituted RBT server associated with a system of the second communication provider. The system of the second communication provider according to the present invention may be embodied to set up the extracted second substituted RBT as a substituted RBT with respect to the second mobile terminal, and to control a predetermined messaging service server to send an affirmative message and a notice message to the first and second mobile terminals according to a process of copying the substituted RBT.

A system of a second communication provider according to an embodiment of the present invention may be independent from a messaging service server or a substituted RBT server storing a substituted RBT. Accordingly, the system of the second communication provider transmits a control instruction to the substituted RBT server and the messaging service server to perform a substituted RBT copying method according to the present invention.

Figure 2:
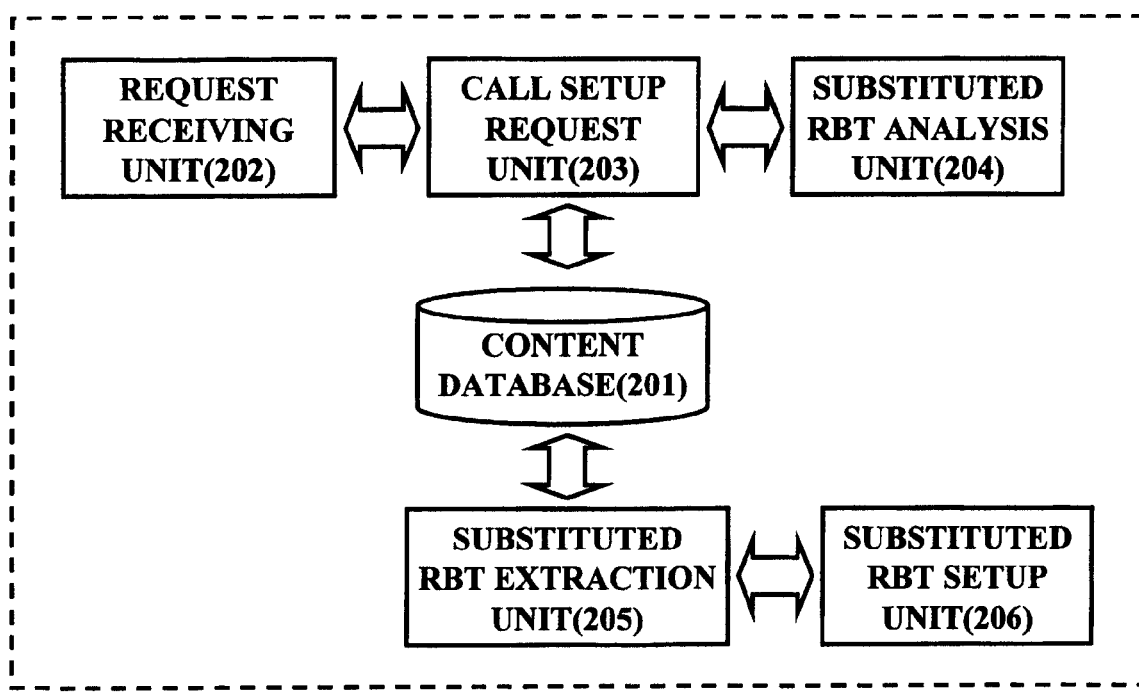
FIG. 2 is a diagram illustrating an internal configuration of a substituted RBT copying system according to the present invention.

FIG. 2 is a diagram illustrating an internal configuration of a substituted RBT copying system according to the present invention.

As illustrated in FIG. 2, a substituted RBT copying system 200 according to the present invention includes a content database 201, a request receiving unit 202, a call setup request unit 203, a substituted RBT analysis unit 204, a substituted RBT extraction unit 205, and a substituted RBT setup unit 206.

The substituted RBT copying system 200 stores and maintains second characteristic data and predetermined identification information corresponding to a second substituted RBT.

The content database 201 individually stores a second substituted RBT corresponding to the identification information and the second characteristic data in a predetermined substituted RBT server. Accordingly, load to a network may be reduced and efficiency of management may be increased. An internal configuration of the content database 201 according to the present invention will be described in detail with reference to FIG. 3. Also, a substituted RBT server corresponding to the content database 201 and containing a second substituted RBT which is played when a call setup is substantially requested, will be described in detail with reference to FIG. 4.

Figure 3:
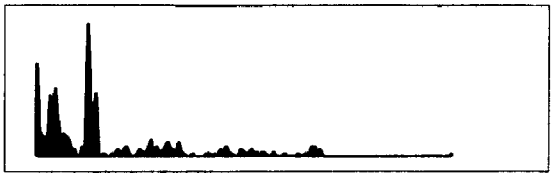
FIG. 3 is a diagram illustrating an internal configuration of a content database according to the present invention.
Figure 3:
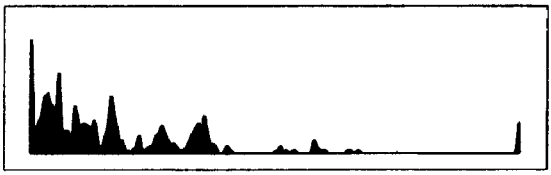
Figure 3:
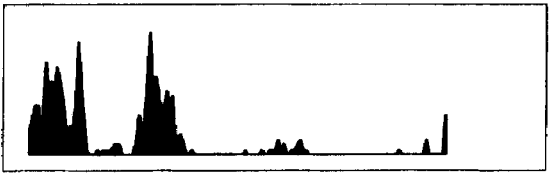
Figure 3:
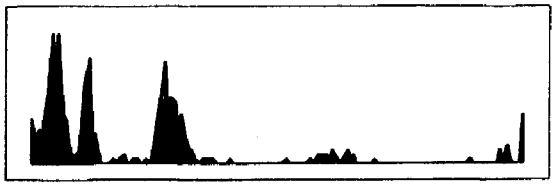

FIG. 3 is a diagram illustrating an internal configuration of a content database according to the present invention.

As illustrated in FIG. 3, as an example of the internal configuration, the content database 201 may include identification information '1111', '2222', '3333' and '4444' and also include second characteristic data corresponding to each identification information.

First or second characteristic data used in the present specification is generated from a predetermined characteristic data extraction device. In this instance, while audio data played from a play device is processed via a preprocessing unit, a particular frequency band or unnecessary signal is removed. As an example of extracting characteristic data, at least one method of a fingerprint which is used for music search or audio watermarking, algorithms which are used for speech recognition (MFCC, LPC coefficient, etc.), general characteristic data which is defined in MPEG 7, and pitch which can be expressed as melody. Also, to extract general characteristic data, the preprocessing unit may function to emphasize a high frequency band, or separate and remove an unnecessary signal, or remove a channel characteristic or an inharmonic frame introduced by a player of audio data.

FIG. 4 is a diagram illustrating an internal configuration of a database maintaining a second substituted RBT according to the present invention.

As illustrated in FIG. 4, a substituted RBT server 401 may include a database recording identification information which is identical to identification information of the content database 201 and a second substituted RBT corresponding to the identification information. Accordingly, characteristic data is extracted by analyzing a predetermined substituted RBT. The extracted characteristic data may extract the identification information by referring to second characteristic data of the content database 201 and select a predetermined second substituted RBT corresponding to the identification information from the substituted RBT server 401. As an example, a second substituted RBT corresponding to the identification information '1111' may be stored and maintained in the substituted RBT server 401, as a sound source having a name of 'Love2.wav'. The identification information may be expressed in combination of numbers and characters. Also, the identification information may be expressed as a unique value capable of identifying a corresponding sound source with less information than second characteristic data. Accordingly, when the content database 201 and the substituted RBT server 401 are independently provided, only identification information may be transmitted. Accordingly, the amount of communication data may be reduced. The substituted RBT server 401 according to an embodiment of the present invention may be included in the substituted RBT copying system. In this case, the identification information may be omitted. In this instance, the second characteristic data and the second substituted RBT simultaneously exist in one system. Accordingly, the amount of communication data is not a significant matter. The substituted RBT copying system according to the present invention may be applied to any one of the aforementioned embodiments.

Referring again to FIG. 2, the request receiving unit 202 receives a request for copying a first substituted RBT of a subscriber of a first communication provider from a subscriber of a second communication provider.

In this instance, the subscriber of the second communication provider requests a predetermined second mobile terminal to set up a call with the subscriber of the first communication provider. Also, the subscriber of the second communication provider requests the substituted RBT copying system to copy the first substituted RBT provided from the first communication provider according to the request for the call setup. The request receiving unit 202 receives the copy request.

According to an embodiment of the present invention, the request receiving unit 202 receives the request for copying of the first substituted RBT from the subscriber of the second communication provider, via WEB or WAP by using wired/wireless Internet. The subscriber of the second communication provider may access the system of the second communication provider via the second mobile terminal and request the copy of the first substituted RBT. Also, the subscriber of the second communication provider may access a predetermined website via a computer terminal and input a unique identification number such as a telephone number of the first mobile terminal to transmit the request for copying of the first substituted RBT to the request receiving unit 202.

According to another embodiment of the present invention, the request receiving unit 202 receives a DTMF tone as the request for copying of the first substituted RBT, from the subscriber of the second communication provider.

While requesting the first mobile terminal to set up a call, the subscriber of the second communication provider inputs a combination of characters or numbers via a keypad of the second mobile terminal. The request receiving unit 202 receives the combination of characters or numbers as a DTMF tone. When the received DTMF tone is predetermined one, the request receiving unit 202 recognizes the DTMF tone as a request for copying of the first substituted RBT provided from the first communication provider. Transmitting the DTMF tone according to an embodiment of the present invention may be performed by the subscriber of the second communication provider after terminating the call with the first mobile terminal.

The call setup request unit 203 requests the first mobile terminal of the subscriber of the first communication provider to set up a call, in correspondence to the request for copying of the first substituted RBT.

The first communication provider and the second communication provider according to the present invention are different communication providers. Accordingly, the communication providers may not exchange information on a substituted RBT to each other. In this instance, the substituted RBT is one of personal information of a subscriber. For the purpose of affirming information on a first substituted RBT provided from the first communication provider, the second communication provider requests the first mobile terminal of the first communication provider to set up a call and affirm the first substituted RBT.

The call setup request unit 203 according to an embodiment of the present invention transmits a predetermined permission message about a copy of a substituted RBT from the subscriber of the second communication provider to the first mobile terminal. After this, the call setup request unit 203 requests the first mobile terminal to set up a call. In this case, the permission message may be transmitted in the form of a predetermined caller identification (CID) presentation supplementary service. Also, in the case of transmitting the permission message, the permission message includes a callback URL. Accordingly, whether the request for copying of the substituted RBT from the second communication provider with respect to the substituted RBT provided from the first communication provider may be permitted may be determined by using the CID service and callback URL. The call setup request unit 203 may request the first mobile terminal to set up a call. The first mobile terminal may transmit a notice message from the second communication provider as a CID, such as "For copying of a substituted RBT, a request for a call setup is now in progress. Please don't answer this call", etc.

The call setup request unit 203 according to an embodiment of the present invention requests the first communication provider to set up a call. In this instance, the call setup request unit 203 may request a call setup for 2-3 seconds only, just before a bell sound or vibration starts according to the request for the call setup. In this case, the amount of a first substituted RBT corresponding to 2-3 seconds is collected. Accordingly, a greater number of similar substituted RBTs may be searched than in the above-described embodiment. However, transmission of a message and the like is not needed.

In the case of requesting the first mobile terminal to set up a call, the substituted RBT analysis unit 204 analyzes a first substituted RBT provided from the first communication provider. Also, the substituted RBT analysis unit 204 recognizes a sound source of the first substituted RBT and analyzes first characteristic data of the first substituted RBT.

When the call setup request unit 203 requests the first mobile terminal to set up a call, the first communication provider plays the first substituted RBT via a predetermined first substituted RBT player. In this instance, the substituted RBT analysis unit 204 recognizes a sound source of the played first substituted RBT and extracts first characteristic data thereof. The sound source may be recognized by using various types of widely used sound source recognition technologies. However, this is beyond the scope of the present invention. Accordingly, description related thereto will be omitted.

The substituted RBT analysis unit 204 according to an embodiment of the present invention includes a substituted RBT recorder.

When a first substituted RBT is played from the first communication provider, the substituted RBT recorder records the first substituted RBT in a predetermined storage unit. Also, the substituted RBT recorder extracts the first characteristic data by referring to the first substituted RBT stored in the storage unit.

The substituted RBT extraction unit 205 extracts identification information of the second substituted RBT corresponding to the first characteristic data by referring to the content database 201.

The content database 201 maintains pre-extracted characteristic data with respect to a predetermined substituted RBT. The substituted RBT extraction unit 205 determines whether the first characteristic data extracted from the substituted RBT extraction unit 205 is identical to the pre-extracted second characteristic data by using pattern matching. When it is determined that there is no second characteristic data identical to the first characteristic data, the most similar second characteristic data thereto may be extracted. The substituted RBT extraction unit 205 according to an embodiment of the present invention may determine a standard of similarity between first characteristic data and second characteristic data. Based on the standard, the substituted RBT extraction unit 205 may extract at least one second characteristic data. Just like the sound source recognition technology, various types of pattern matching methods may be used for pattern matching. However, this is also beyond the scope of the present invention. Accordingly, detailed description related thereto will be omitted.

The substituted RBT extraction unit 205 extracts identification information of the extracted second characteristic data, transmits the extracted identification information to a predetermined substituted RBT server and extracts a substituted RBT corresponding to the identification information. Identification information according to an embodiment of the present invention includes at least one identification information. The substituted RBT corresponding to the identification information also includes at least one substituted RBT.

Also, the substituted RBT extraction unit 205 according to an embodiment of the present invention may be replaced with a predetermined query transmission unit. In this case, first characteristic data of a first substituted RBT extracted from the substituted RBT analysis unit 204 is transmitted to a predetermined sound source management server as a query. Identification information of a second substituted RBT may be received as a response to the query, from the sound source management server. Accordingly, the second substituted RBT may be extracted by referring to the identification information thereof. Also, the second substituted RBT may be set up as a substituted RBT of the second mobile terminal according to the present invention.

The substituted RBT setup unit 206 sets up a substituted RBT corresponding to the identification information extracted from the substituted RBT extraction unit 205, as a second RBT of the second mobile terminal. Through this, the system of the second communication provider provides the setup second substituted RBT to a communication terminal requesting the second mobile terminal to set up a call. The substituted RBT server according to the present invention is included in a substituted RBT setup system according to the present invention.

Also, the substituted RBT setup unit 206 may include a predetermined message transmission unit. The message transmission unit transmits a message to a first mobile terminal or a second mobile terminal. A substituted RBT message transmission unit according to an embodiment of the present invention does not directly transmit a message to a first or second mobile terminal. The substituted RBT message transmission unit may send a message to a first or second mobile terminal by transmitting a message transmission command to a predetermined message transmission server.

The message according to an embodiment of the present invention is an affirmative message from a subscriber of the second mobile terminal, in association with copying of the substituted RBT. The message is received in the second mobile terminal. The subscriber of the second mobile terminal may transmit a predetermined confirmation procedure to the substituted RBT copying system, as a response to the message. In this case, the confirmation procedure is provided from the message.

The message according to another embodiment of the present invention is a message having the meaning of informing a subscriber of a first mobile terminal that a subscriber of a second mobile terminal wants to copy a substituted RBT, and asking the subscriber of the first mobile terminal whether to permit the above event. In this case, the message may be as a CID. In the case of an SMS type, the message may contain a predetermined callback URL for access to the substituted RBT copying system according to the present invention.

The message according to still another embodiment of the present invention is a messaging having the meaning of informing a subscriber of a first mobile terminal that the substituted RBT copying system is currently extracting first characteristic data of the first substituted RBT or copying the first substituted RBT. In this case, the message may be as a CID, and notified to the subscriber of the first mobile terminal. Also, as an example, the message transmission unit may transmit a message to the second mobile terminal, the message informing that the substituted RBT copying system has completed copying the first substituted RBT.

Figure 5:
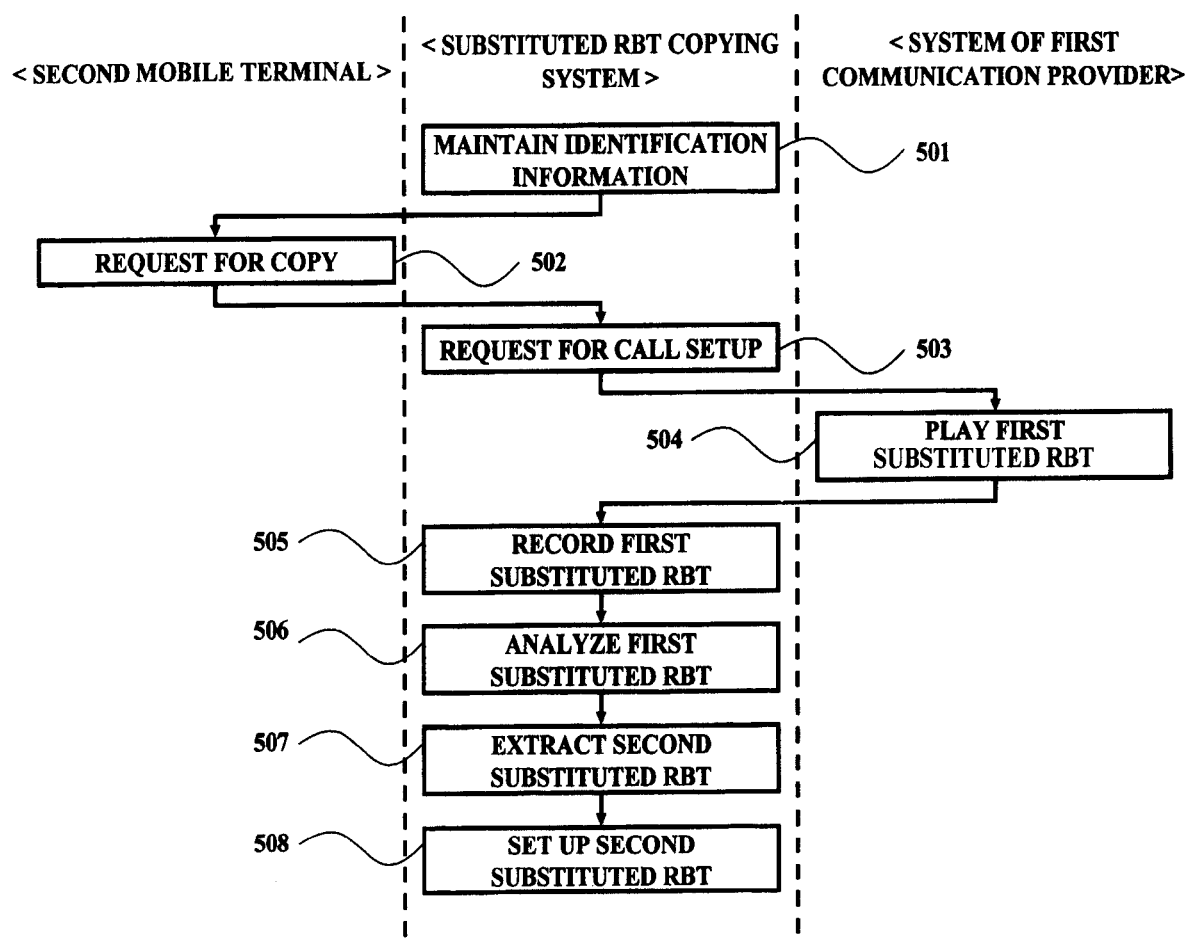
FIG. 5 is a flowchart illustrating a process of copying a substituted RBT according to the present invention.

FIG. 5 is a flowchart illustrating a process of copying a substituted RBT according to the present invention.

In step 501, a system of a second communication provider stores and maintains identification information of a second substituted RBT, second characteristic data and a second substituted RBT corresponding to the second characteristic data in a content database. When a request for a call setup is received from a mobile terminal, a substituted RBT according to the present invention is provided to the mobile terminal having requested the call setup. However, if the substituted RBT is provided for the purpose of its copy, it may offend a corresponding subscriber.

Figure 6:
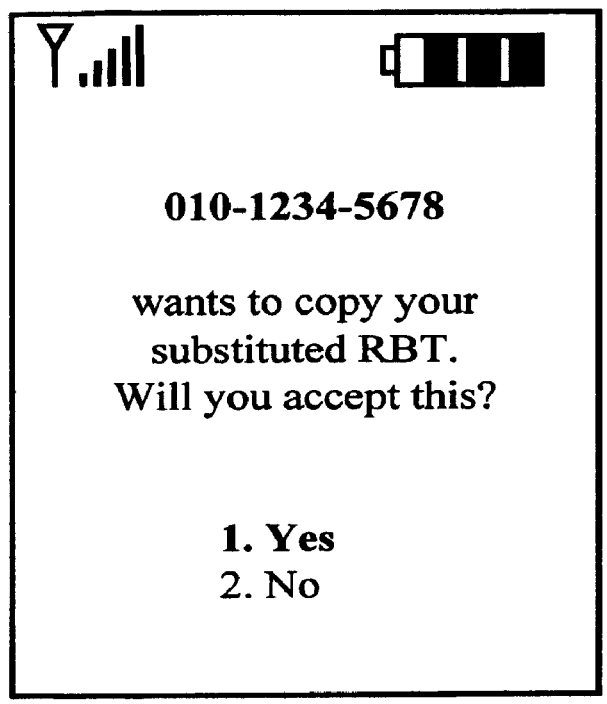
FIGS. 6 to 8 are diagrams illustrating an example of a message received from a substituted RBT copying system while a second mobile terminal performs copying a substituted RBT.

To prevent the aforementioned problem, FIG. 6 illustrates an example of a message confirming whether a subscriber of a first mobile terminal accepts a request for copying of a first substituted RBT from a subscriber of a second mobile terminal, before providing the substituted RBT. Namely, since the message of FIG. 6 is transmitted to the first mobile terminal, a dispute which may occur due to the copying of the substituted RBT may be prevented.

The second substituted RBT according to an embodiment of the present invention may be maintained in a substituted RBT providing system which is different from the substituted RBT copying system. Also, the second substituted RBT may be provided to a user.

In step 502, the second mobile terminal requests the substituted RBT copying system to copy a first substituted RBT. In this instance, the first substituted RBT is provided according to the request for the call setup with the first mobile terminal belonging to a first communication provider. As an example, the copy request may be performed by transmitting a DTMF tone signal via a keypad while the second mobile terminal sets up a call with the first mobile terminal. As another example, the copy request may be performed via mobile Internet access using the second mobile terminal or via wired/wireless Internet access using a computer terminal. In step 503, the substituted RBT copying system receives the copy request and requests the first mobile terminal to set up a call. In step 504, according to the request for the call setup, a system of the first communication provider plays a first substituted RBT corresponding to the first mobile terminal. In step 505, the substituted RBT copying system records the first substituted RBT which is being played.

In step 506, the substituted RBT copying system according to the present invention analyzes the recorded first substituted RBT and extracts first characteristic data. The first characteristic data may be extracted by using a predetermined sound source recognition technology.

Step 505 of recording the first substituted RBT may be omitted. In this instance, the first characteristic data is extracted in real time from the first substituted RBT which is being played. The substituted RBT copying system searches the content database by referring to the extracted first characteristic data. In this instance, the content database maintains a second substituted RBT or identification information corresponding to the first characteristic data. When a second substituted RBT is not maintained in the content database, the second substituted RBT is maintained in a predetermined substituted RBT server. Accordingly, in step 507, the substituted RBT copying system extracts the second RBT from the substituted RBT server by referring to the identification information.

Figure 7:

In step 508, the substituted RBT copying system sets up the extracted second substituted RBT as a substituted RBT to be provided according to a request of a call setup of the second mobile terminal. In this instance, when a second substituted RBT with respect to first characteristic data is at least one, the substituted RBT copying system provides the subscriber of the second mobile terminal with a list of the second substituted RBT in step 508. Accordingly, the subscriber may select a desired substituted RBT from the list. FIG. 7 illustrates a list showing a plurality of second substituted RBTs when first characteristic data is similar to at least one second substituted RBT following a search via a substituted RBT server.

As illustrated in FIG. 7, according to an embodiment of the present invention, a list of second substituted RBTs corresponding to second characteristic data, which is similar to first characteristic data, includes "1. Love2," "2. Poem," and "3. Sad promise." An order of the list may be determined on the basis of similarity. When a first substituted RBT heard by a subscriber of a first mobile terminal is "Love2", the subscriber may press a keypad of number 1 from keypads of the second mobile terminal and select the "Love2" as a second substituted RBT. The second substituted RBT is set up as a substituted RBT of the second mobile terminal.

Figure 8:
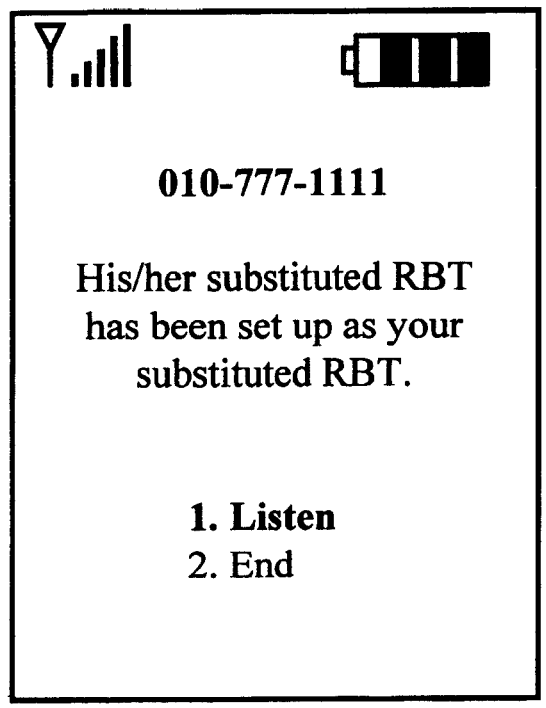

FIG. 8 illustrates an example of a completion message informing that a second substituted RBT provided in correspondence to a request from the second mobile terminal is copied from a first substituted RBT and set up as a substituted RBT of the second mobile terminal.

A substituted RBT copying system according to the present invention copies a first substituted RBT, recognizes a sound source and searches a predetermined database. In this case, when a second substituted RBT is set up as a substituted RBT identical to the first substituted RBT, as illustrated in FIG. 8, the substituted RBT copying system may transmit a message to the second mobile terminal, the message informing that the setup is completed. A subscriber of the second mobile terminal receives the message. In this instance, the subscriber may select "1. Listen" and listen to the second substituted RBT. Also, the subscriber may select "2. End" and terminate a procedure provided according to a copy of the substituted RBT.

The substituted RET copying method according to the present invention includes computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 9:
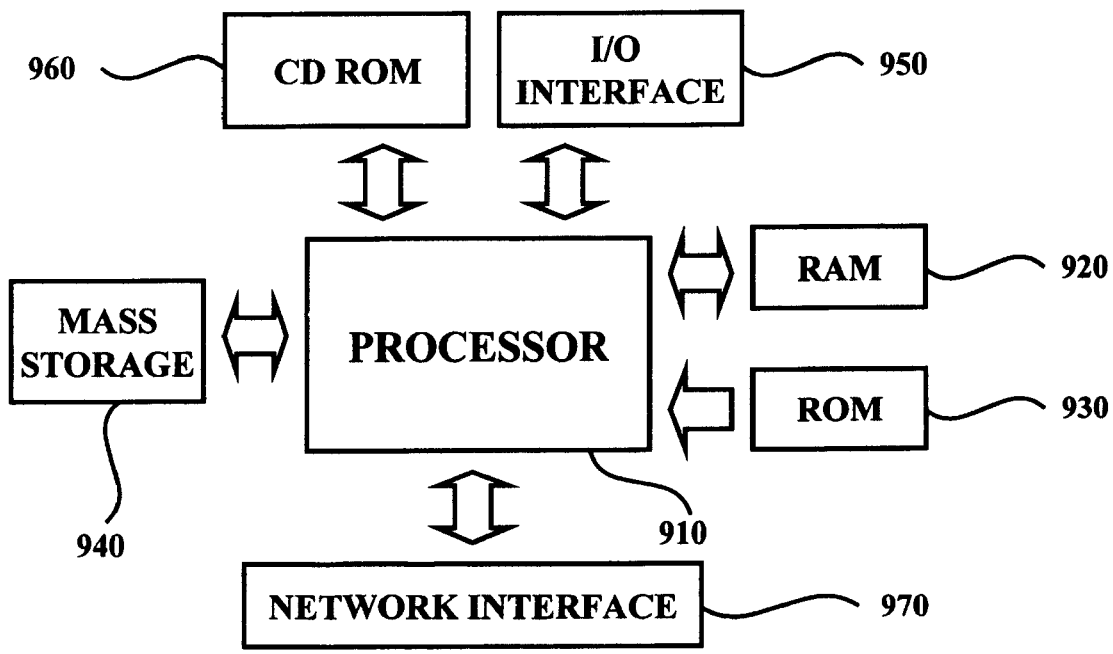
FIG. 9 is an internal block diagram of a general purpose computer which may be employed in implementing the substituted RBT copying method according to the present invention.

FIG. 9 is an internal block diagram of a general purpose computer which may be employed in implementing the substituted RBT copying method according to the present invention.

FIG. 9 is a block diagram illustrating a computer apparatus 900 which includes at least one processor 910 connected to a main memory device including a RAM (Random Access Memory) 920 and a ROM (Read Only Memory) 930. The processor 910 is also known as a central processing unit CPU.

As well-known in the field of the art, the ROM 930 unidirectionally transmits data and instructions to the CPU, and the RAM 920 is generally used for bidirectionally transmitting data and instructions. The RAM 920 and the ROM 930 may include a certain proper form of a computer readable recording medium. A mass storage device 940 is bidirectionally connected to the processor 910 to provide additional data storage capacity and may be one of number of computer readable recording mediums. The mass storage device 940 is used for storing programs and data and is an auxiliary memory. A particular mass storage device such as a CD ROM 960 may be used. The processor 910 is connected to at least one input/output interface 950 such as a video monitor, a track ball, a mouse, a keyboard, a microphone, a touch-screen type display, a card reader, a magnetic or paper tape reader, a voice or hand-writing recognizer, a joy stick, or other known computer input/output unit. The processor 910 may be connected to a wired or wireless communication network via a network interface 970. The procedure of the described method can be performed via the network connection. The described devices and tools are well-known to those skilled in the art of computer hardware and software.

The described hardware devices may be configured to act as one or more software modules in order to perform the operations of the present invention.

According to the present invention, it may be possible to easily copy a substituted RBT from another user's substituted RBT and set up the same as a user's own substituted RBT. In this instance, the substituted RBT is provided according to a request for a call setup of a mobile terminal.

Although a few embodiments of the present invention have been shown and described, the present invention is not limited to the described embodiments. Also, a substituted RBT copying system and method according to the present invention may be applied to a ring-to-you method in which a substituted RBT set up by a called party is provided for a calling party, and also may be applied to a ring-to-me method in which a substituted RBT set up by a calling party is provided back to the calling party while the calling party is making a call. Namely, the substituted RBT copying system according to the present invention may be applied to any detailed embodiments associated with transmission of a substituted RBT.

While this invention has been particularly shown and described with reference to preferred embodiments thereof, various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

INDUSTRIAL APPLICABILITY

According to the present invention, it is possible to easily copy a substituted RBT from another user's substituted RBT and set up the same as a user's own substituted RBT. In this instance, the substituted RBT is provided according to a request for a call setup of a mobile terminal.

Also, according to the present invention, it is possible to set up a substituted RBT of a subscriber of a different communication provider as a user's substituted RBT, while not receiving predetermined information from the communication provider.

Also, according to the present invention, in a process of requesting a call setup, it is possible to transmit a predetermined DTMF tone from a communication provider of a called party for a substituted RBT being played, and to set up the same as a user's substituted RBT.

The invention claimed is:

1. A system for copying a substituted ring back tone (RBT) between subscribers of different communication providers, the system comprising:

a content database maintaining identification information of a second substituted RBT;

a request receiving unit receiving a request for copying a substituted RBT of a subscriber of a first communication provider, from a subscriber of a second communication provider;

a call setup request unit requesting a first mobile terminal of the subscriber of the first communication provider to set up a call in correspondence to the request for copying of the substituted RBT;

a substituted RBT analysis unit analyzing a first substituted RBT provided from the first communication provider and recognizing a sound source of the first substituted RBT to analyze first characteristic data of the first substituted RBT, in the case of requesting the first mobile terminal to set up a call;

a substituted RBT extraction unit extracting the identification information of the second substituted RBT corresponding to the first characteristic data by referring to the content database; and a substituted RBT setup unit setting up a second substituted RBT corresponding to the identification information extracted from the substituted RBT extraction unit, as a substituted RBT for a second mobile terminal of the subscriber of the second communication provider;

said content database further records second characteristic data corresponding to the identification information of the second substituted RBT, and said substituted RBT extraction unit searches the content database for the second characteristic data corresponding to the first characteristic data which is analyzed by the substituted RBT analysis unit, and extracts predetermined identification information or the second substituted RBT corresponding to the second characteristic data.

2. A system for copying a substituted RBT between subscribers of different communication providers, the system comprising:

a request receiving unit receiving a request for copying a substituted RBT of a subscriber of a first communication provider, from a subscriber of a second communication provider;

a call setup request unit requesting a first mobile terminal of the subscriber of the first communication provider to set up a call in correspondence to the request for copying of the substituted RBT;

a substituted RBT analysis unit analyzing a first substituted RBT provided from the first communication provider and recognizing a sound source of the first substituted RBT to analyze first characteristic data of the first substituted RBT, in the case of requesting the first mobile terminal to set up a call;

a query transmission unit transmitting the analyzed first characteristic data to a predetermined sound source management server as a query; and a substituted RBT setup unit receiving identification information of a second RBT corresponding to the first characteristic data as a response, from the sound source management server, and setting up a second substituted RBT corresponding to the identification information, as a substituted RBT for a second mobile terminal of the subscriber of the second communication provider;

the substituted RBT setup unit includes a predetermined message transmission unit controlling a predetermined short message service (SMS) server to transmit a confirmation request message of the subscriber of the second communication provider to the second mobile terminal in association with the copy of the substituted RBT, the confirmation request message including a callback uniform resource locator (URL) for access to the substituted RBT copying system.

3. The system of claim 1, wherein:

the substituted RBT setup unit includes a predetermined message transmission unit controlling a predetermined short message service (SMS) server to transmit a confirmation request message of the subscriber of the second communication provider to the second mobile terminal in association with the copy of the substituted RBT, the confirmation request message including a callback uniform resource locator (URL) for access to the substituted RBT copying system.

4. The system of claim 1 or 2, wherein:

the call setup request unit transmits an information message to the first mobile terminal of the subscriber of the first communication provider in association with the copy of the substituted RBT.

5. The system of claim 1, wherein:

the substituted RBT analysis unit includes a substituted RBT recorder recording the first substituted RBT.

6. The system of claim 1, wherein:

the request receiving unit receives the request for copying of the substituted RBT from the subscriber of the second communication provider via wired/wireless Internet access or Wireless Application Protocol (WAP).

7. The system of claim 1, wherein:

the request receiving unit receives a particular Dual Tone Multi Frequency (DTMF) tone from the subscriber of the second communication provider as the request for copying of the substituted RBT, while making a call between the second mobile terminal and the first mobile terminal.

8. A method for copying a substituted RBT between subscribers of different communication providers, the method comprising the steps of:

maintaining identification information of a second substituted RBT;

receiving a request for copying a substituted RBT of a subscriber of a first communication provider, from a subscriber of a second communication provider;

requesting a first mobile terminal of the subscriber of the first communication provider to set up a call in correspondence to the request for copying of the substituted RBT;

analyzing a first substituted RBT provided from the first communication provider and recognizing a sound source of the first substituted RBT to analyze first characteristic data of the first substituted RBT, in the case of requesting the first mobile terminal to set up a call;

extracting the identification information of the second substituted RBT corresponding to the first characteristic data by referring to the content database;

setting up the second substituted RBT corresponding to the identification information extracted from the substituted RBT extraction unit, as a substituted RBT for a second mobile terminal of the subscriber of the second communication provider;

recording the second characteristic data corresponding to the identification information of the second substituted RBT; and searching the content database for the second characteristic data corresponding to the first characteristic data;

analyzing the second characteristic data corresponding to the first characteristic data; and extracting predetermined identification information or the second substituted RBT corresponding to the second characteristic data.

9. A method for copying a substituted RBT between subscribers of different communication providers, the method comprising:

receiving a request for copying a substituted RBT of a subscriber of a first communication provider, from a subscriber of a second communication provider;

requesting a first mobile terminal of the subscriber of the first communication provider to set up a call in correspondence to the request for copying of the substituted RBT;

analyzing a first substituted RBT provided from the first communication provider and recognizing a sound source of the first substituted RBT to analyze first characteristic data of the first substituted RBT, in the case of requesting the first mobile terminal to set up a call;

transmitting the analyzed first characteristic data to a predetermined sound source management server as a query;

receiving identification information of a second RBT corresponding to the first characteristic data as a response, from the sound source management server, and setting up the second substituted RBT corresponding to the identification information, as a substituted RBT for a second mobile terminal of the subscriber of the second communication provider controlling a predetermined short message service (SMS) server to transmit a confirmation request message of the subscriber of the second communication provider to the second mobile terminal in association with the copy of the substituted RBT, the confirmation request message including a callback uniform resource locator (URL) for access to the substituted RBT copying system.

10. The method of claim 8 or 9, further comprising the step of:

recording the first substituted RBT provided from the first communication provider.

11. A computer readable record medium recording a program for implementing the method according to any one of claims 8 and 9, said program being stored on said computer readable record medium, whereby, when executed, said program performing the method steps according to any one of claims 9 and 10.

* * * * *